(12) United States Patent
Hebron

(10) Patent No.: US 7,275,779 B2
(45) Date of Patent: Oct. 2, 2007

(54) CANOPY LIFT SYSTEM

(76) Inventor: Keith H. Hebron, 2029 Grieve Road, Nanaimo, British Columbia (CA) V9X 1J1

( * ) Notice: Subject to any disclaimer, the term of this patent is extended or adjusted under 35 U.S.C. 154(b) by 0 days.

(21) Appl. No.: 10/783,294

(22) Filed: Feb. 20, 2004

(65) Prior Publication Data

US 2005/0184553 A1 Aug. 25, 2005

(51) Int. Cl.
*B60P 7/02* (2006.01)
(52) U.S. Cl. .................................. 296/100.1
(58) Field of Classification Search ........... 296/100.06, 296/100.08, 100.1, 164, 167, 165, 169, 172, 296/173, 176, 175, 26.06, 26.07
See application file for complete search history.

(56) References Cited

U.S. PATENT DOCUMENTS

| | | | | |
|---|---|---|---|---|
| 3,923,334 A | * | 12/1975 | Key ........................ | 296/100.1 |
| 4,819,981 A | * | 4/1989 | Moe et al. .................. | 296/164 |
| 4,982,971 A | * | 1/1991 | Marin ........................ | 280/30 |
| 5,403,061 A | * | 4/1995 | Micknowicz ............... | 296/164 |
| 5,704,681 A | * | 1/1998 | Lambden ............... | 296/100.06 |
| 5,971,446 A | * | 10/1999 | Lunney, II ............. | 296/100.08 |
| 5,988,728 A | * | 11/1999 | Lund et al. ............ | 296/100.03 |
| 6,042,173 A | * | 3/2000 | Nett ....................... | 296/100.06 |
| 6,042,175 A | * | 3/2000 | Williams ............... | 296/100.06 |
| 6,186,580 B1 | * | 2/2001 | Nothem et al. .......... | 296/100.1 |
| 6,505,875 B1 | * | 1/2003 | Laper ..................... | 296/43 |
| 6,623,062 B1 | * | 9/2003 | Hoffman ................. | 296/100.1 |
| 6,749,249 B1 | * | 6/2004 | Lang ...................... | 296/100.1 |
| 6,764,125 B2 | * | 7/2004 | Bacon .................. | 296/100.08 |
| 6,796,263 B2 | * | 9/2004 | Meyer .................... | 296/100.1 |
| 6,814,387 B2 | * | 11/2004 | Lake ..................... | 296/100.06 |
| 6,830,281 B2 | * | 12/2004 | Hoffman ................. | 296/100.1 |
| 2001/0038225 A1 | * | 11/2001 | Muirhead ............. | 296/100.06 |
| 2002/0005651 A1 | * | 1/2002 | Young et al. ............ | 296/100.1 |
| 2004/0084928 A1 | * | 5/2004 | Bacon ................... | 296/100.06 |

* cited by examiner

*Primary Examiner*—Lori L. Lyjak

(57) ABSTRACT

A mechanical lift system for a truck topper comprising a power lift arm and securing one side of the truck topper to the upper side of the truck bed by a continuous hinge or a series of two or more hinges allowing the truck topper to open 90 degrees and close the truck topper.

4 Claims, 2 Drawing Sheets

CANOPY LIFT SYSTEM

DETAILED DESCRIPTION OF THE INVENTION

In reference to FIGS. 1, and 2, the inside base 1 of a longitudinal side of a vehicle canopy or cover 2 is affixed to the top side of the truck bed 3 by a series of hinges 4 or a continuous hinge, all of which will maintain stability of the cover when lifting, closing, or in the open or closed position. In reference to FIG. 1, the top flange of the hinge 4 is secured to the bottom of the canopy or cover side in a safe and appropriate manner. In reference to FIG. 2, the end of the bottom flange of hinge 4 is bent at a 90 degree angle downward in order to secure the hinge to the top inside portion of the truck bed. This is done to accommodate a safe and easy method of attaching the canopy or lid to the vehicle.

In reference to FIG. 3, the mechanical lift system is comprised of two parts. The first part is comprised of a base plate 5, which is preferably affixed to the top of a vehicle wheel well 6, and an upright arm 7 which is permanently attached to the base plate 5. The upright arm 7 is then attached to the top inside of the truck bed 3 via a moveable plate and sleeve 9 which is attached to the upright arm 7. Again, in reference to the base plate 5, a pivotal point 10 is attached to the base plate to accommodate the base of the power pack 11 used. In addition, the top of the upright arm 7 has also a pivotal point 12.

The second part of the mechanical lift system is the lift arm mechanism. Again, in reference to FIG. 3, it is comprised of a lift arm 13 that is attached to pivotal point 12, and follows the upward contour of the canopy 2 to the cover ceiling. It then follows adjacent to the canopy ceiling in a parallel manner to the opposite side of the canopy ceiling to pivotal point 14. In addition, the lift arm 13 has a guide arm 15 with a pivotal point 16 at its end. Pivotal point 16 is the connection point for the top end of the power lift 11. Also attached to the guide arm 15, is a support arm 17 which also attaches to the upper portion of the lift arm 13. The lift arm mechanism continues with a down arm 18 connected to pivotal point 14 and follows downward the contour of the canopy side and connects with pivotal point 19 which is on inside base cover plate 20. The inside cover base plate 20 is attached to the canopy inside cover base 21.

A heavy gauge wire (12) should be used to connect the power pack 11 to the vehicle battery through an ON-OFF-ON 3-way toggle (intermittent rocker) switch. A 20 amp fuse should be placed on line between the battery and the toggle switch. This switch may be placed where it is most convenient to the customer.

The novel of this operation is the fact that it is simple and uncomplicated. We are using a structure (the canopy) that was intended to be a rigid on a truck box, to be opened and closed at will, thus allowing complete access to the truck bed and free access to all cargo you haul eg: fuel tanks, service lubricants, tools, miscellaneous equipment. When using this lift arm, the canopy is automatically secured while in the down position due to the character of the actuator used.

DESCRIPTION OF PRIOR ART

Figure 1:
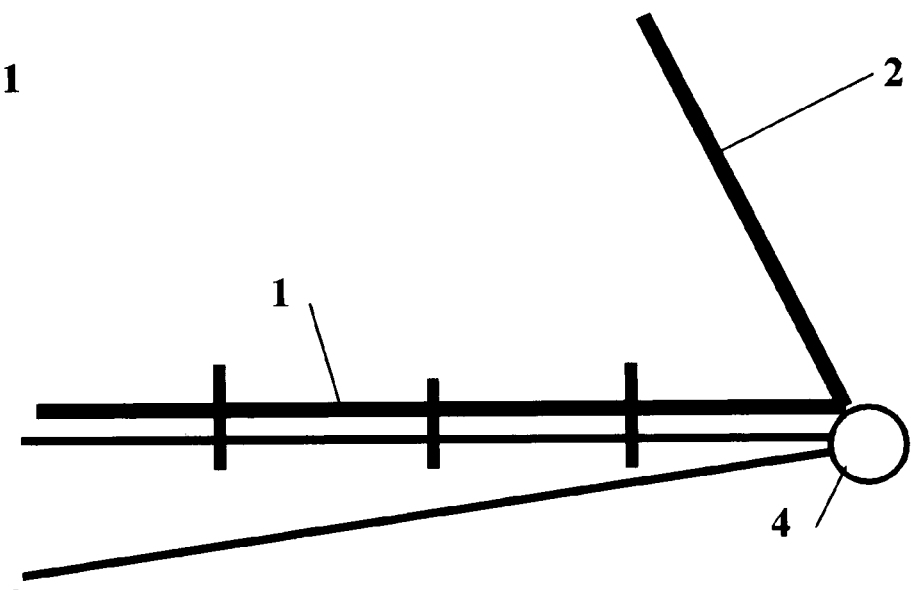
FIG. 1—is a perspective view of attaching the upper hinge flange to the bottom side of a vehicle canopy or cover.
Figure 2:
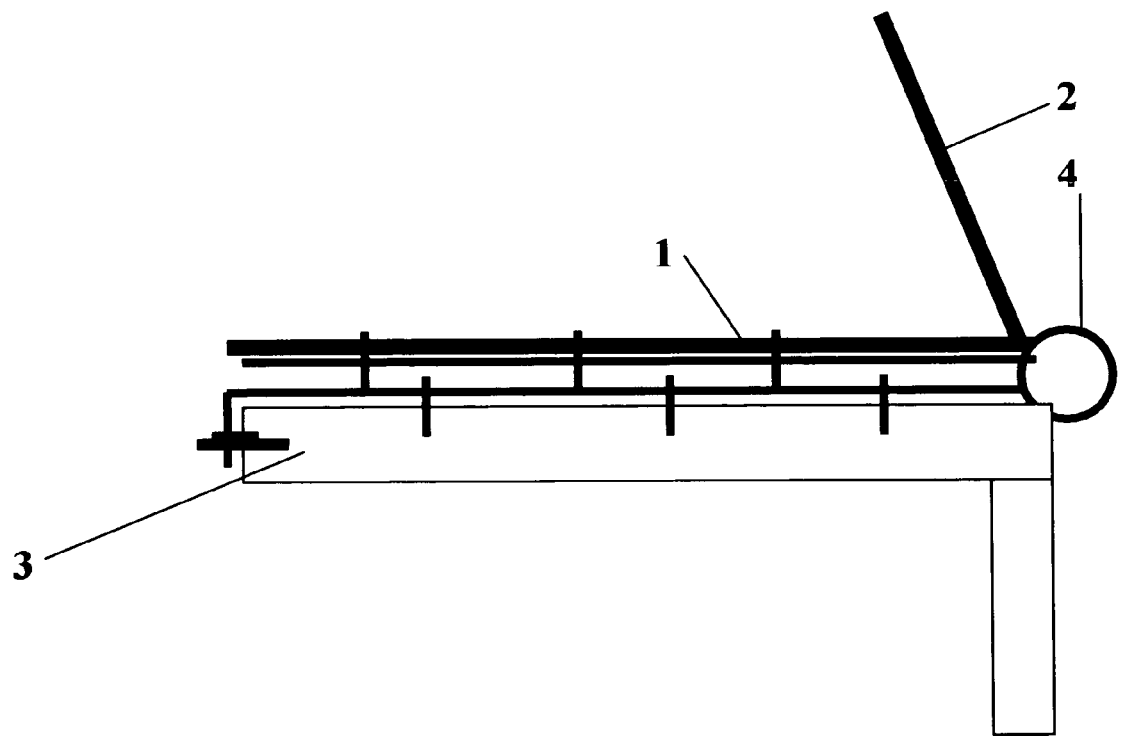
FIG. 2—is a perspective view of the bottom hinge flange with the end of the flange bent over at a 90 degree angle where it is secured to the top side of the vehicle bed.
Figure 3:
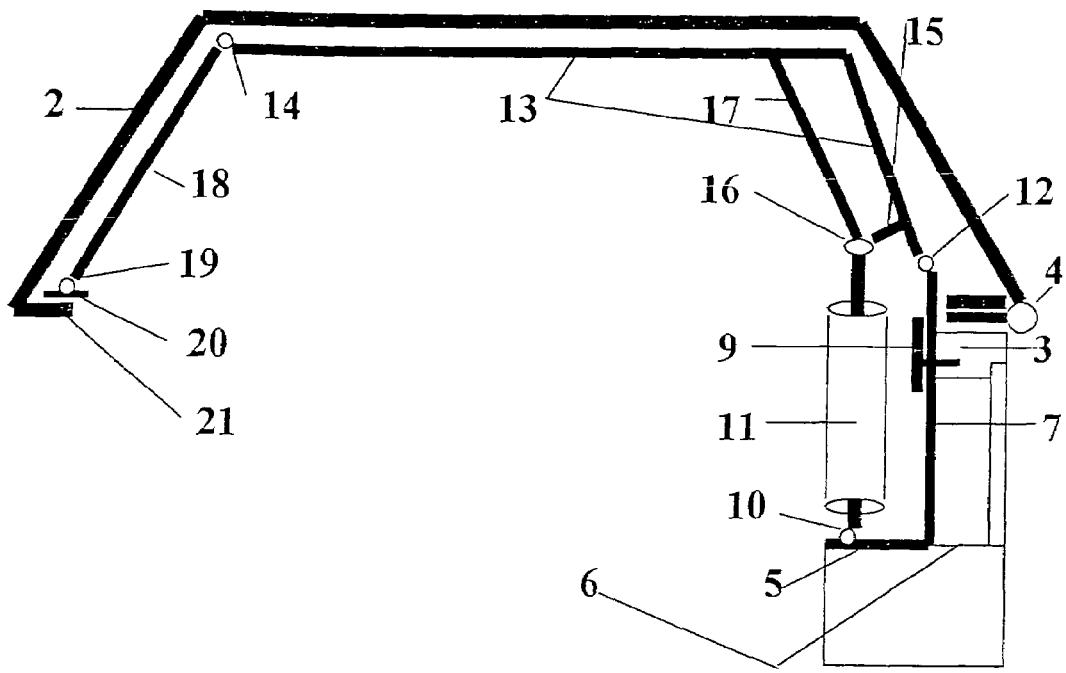
FIG. 3—is a perspective view of the complete lift arm and power system as seen attached to the vehicle bed.
Figure 4:
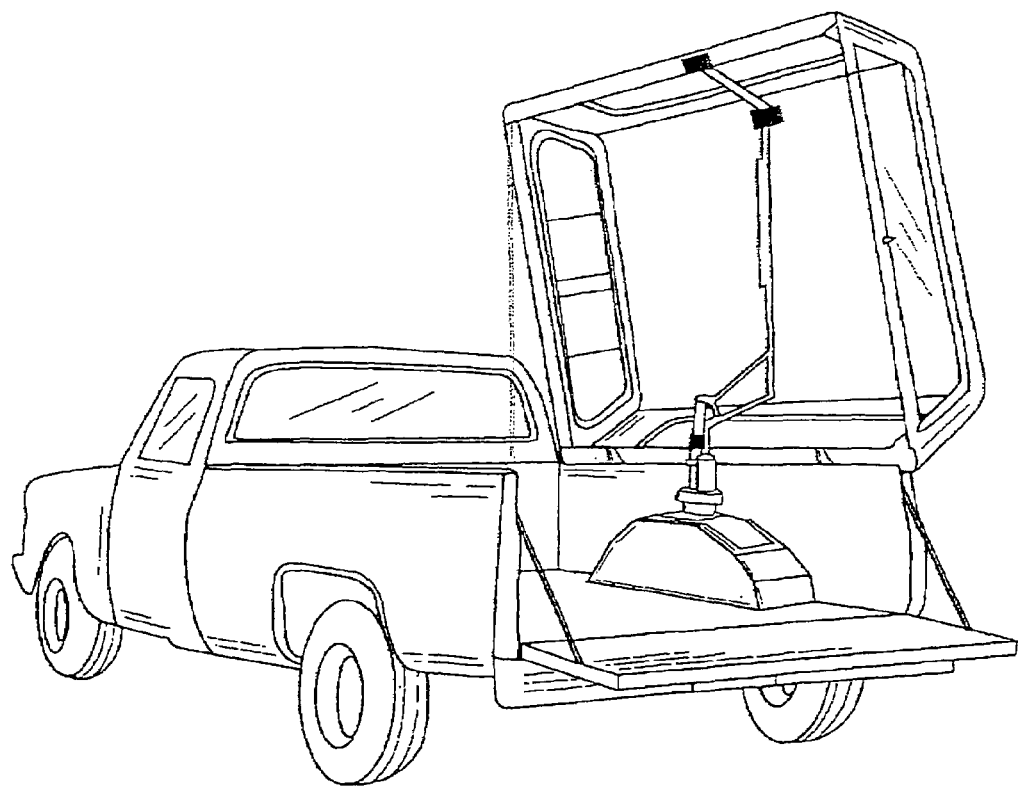
FIG. 4—is a perspective view of an installed canopy lift system with the canopy nearly in the vertical or open position.

A search for prior art includes: U.S. Pat. No. 3,578,387 LIFTABLE VEHICLE TOP; U.S. Pat. No. 3,923,334 TRUCK BODY CLOSURE; U.S. Pat. No. 3,954,296 VEHICLE BED COVER ASSEMBLY; U.S. Pat. No. 4,101,162 RAISABLE TOPPER; U.S. Pat. No. 4,277,098 VERTICALLY SWINGABLE CAMPER SHELL; U.S. Pat. No. 4,420,181 TRUCK BED CAP STRUCTURE; U.S. Pat. No. 4,768,824 TRUCK BED COVERING; U.S. Pat. No. 5,102,185 LOAD BED LIFT ROOF COVER; U.S. Pat. No. 5,503,450 TRUCK LID LIFT SYSTEM; U.S. Pat. No. 5,909,921 TRUCK CARGO COVER.

What is claimed is:

1. A mechanical lift system to open and close a truck topper comprising:
    a power lift arm;
    and securing one side of the truck topper to the upper side of the truck bed by hinge means to allow the truck topper to open 90 degrees and close the truck topper.

2. The mechanical lift system as claimed in claim 1 comprising:
    a base plate which is secured to the inside bed of the vehicle;
    an upright arm connected to the base plate and secured to the inside portion of the upper rim of the truck bed;
    and a lift arm which is pivotally connected to the upright arm, and follows with other pivotal connections inside contour of the truck topper to opposite inside base of the truck topper.

3. The mechanism lift system as claimed in claim 2 wherein an enclosed heavy duty actuator power unit comprised of:
    a ball screw actuator piston which connects to the lift arm via an in line-clevis with a base housing connected to the base plate with an in-line base clevis;
    a 12 volt direct current motor, driving a gear reduction system attached to the encased screw jack piston which lifts and lowers the topper on demand via a reverse polarity toggle switch.

4. The mechanism lift system as claimed in claim 2 wherein a hydraulic lift arm comprised of:
    a hydraulic cylinder piston that connects to the lift arm via an in-line clevis with a cylinders base housing connected to the base plate with an in-line base clevis;
    a hydraulic or electric hydraulic pump, powered by the truck with control valves and lines connected to the hydraulic cylinder.

* * * * *